(12) United States Patent
Fowler

(10) Patent No.: US 12,590,233 B2
(45) Date of Patent: Mar. 31, 2026

(54) SPRAYABLE COMPOSITION AND METHOD

(71) Applicant: Quin Global US, Inc., Omaha, NE (US)

(72) Inventor: Carl Fowler, Perth (GB)

(73) Assignee: Quin Global US, Inc., Omaha, NE (US)

( * ) Notice: Subject to any disclaimer, the term of this patent is extended or adjusted under 35 U.S.C. 154(b) by 868 days.

(21) Appl. No.: 17/632,297

(22) PCT Filed: Aug. 7, 2020

(86) PCT No.: PCT/EP2020/072298
§ 371 (c)(1),
(2) Date: Feb. 2, 2022

(87) PCT Pub. No.: WO2021/028356
PCT Pub. Date: Feb. 18, 2021

(65) Prior Publication Data
US 2022/0290016 A1    Sep. 15, 2022

(30) Foreign Application Priority Data

Aug. 9, 2019    (GB) ...................................... 1911437

(51) Int. Cl.
*C09J 153/02*        (2006.01)
*B65D 83/141*        (2025.01)
*C09K 3/30*        (2006.01)
*C09K 21/08*        (2006.01)
*B65D 83/42*        (2006.01)

(52) U.S. Cl.
CPC .......... *C09J 153/02* (2013.01); *B65D 83/141* (2025.01); *C09K 3/30* (2013.01); *C09K 21/08* (2013.01); *B65D 83/425* (2013.01)

(58) Field of Classification Search
CPC .......... C09J 153/02; C09K 3/30; C09K 21/08; B65D 83/141; B65D 83/425; B05B 9/04
See application file for complete search history.

(56) References Cited

U.S. PATENT DOCUMENTS 10,273,437 B2 *    4/2019    Vargas ...................... B08B 3/02
10,883,025 B1 *    1/2021    Purvis, II ................. C09J 11/08
(Continued)

FOREIGN PATENT DOCUMENTS

CN        106047264        10/2016
WO        9744382        11/1997
(Continued)

OTHER PUBLICATIONS

European Patent Office, International Search Report and Written Opinion for International Patent Application No. PCT/EP2020/072298, Feb. 22, 2021.

*Primary Examiner* — Scott R. Walshon
(74) *Attorney, Agent, or Firm* — Suiter Swantz IP

(57) ABSTRACT

A sprayable composition includes a composition including at least one core component and at least one solvent. The at least one core component includes at least one polymer or resin and the solvent includes transdichloroethylene. The sprayable composition also includes a flammability reducer (3,3,3-trifluoropropene) and a gas propellant (carbon dioxide). The amount of gas propellant is in the range of about 8-20 wt % relative to the total amount of the sprayable composition.

3 Claims, 2 Drawing Sheets

(56) References Cited

U.S. PATENT DOCUMENTS

| 2009/0305876 | A1 |   | 12/2009 | Singh et al. |
| 2013/0004435 | A1 | * | 1/2013 | Cook ................. C23G 5/02825 |
|  |  |  |  | 521/88 |
| 2013/0165363 | A1 |   | 6/2013 | Decaire et al. |

FOREIGN PATENT DOCUMENTS

| WO | 2005054324 | 6/2005 |
| WO | 2015054174 | 4/2015 |

* cited by examiner

SPRAYABLE COMPOSITION AND METHOD

CROSS-REFERENCE TO RELATED APPLICATIONS

This application is a U.S. National Stage of International Application No. PCT/EP2020/072298 filed on Aug. 7, 2020 that claims priority to GB Application No. 1911437.0, filed on Aug. 9, 2019, the disclosures of which are incorporated herein by reference as if set forth in their entireties.

FIELD OF THE INVENTION

The present disclosure relates to sprayable compositions and to method for preparing sprayable compositions.

BACKGROUND

Adhesives are compositions which promote or facilitate the bonding of two surfaces to each other. Many types of adhesive exist, and the choice of a particular adhesive may depend on a number of factors, including, for example, the chemical and/or physical nature of the surface or surfaces to which the adhesive is applied, the intended use for the adhesive and/or the bonded product, the environment and/or conditions to which the product and/or adhesive will be exposed (temperature, pressure, humidity, etc), and the bonding performance required for the desired application.

Adhesives may be provided in different forms, such as hot melt adhesives, pressure-sensitive adhesives, or liquid adhesives which can be provided as a solution (solvent-based) or as a dispersion/emulsion. Adhesives can also be applied by different means, including using brushes, rollers, applicator (e.g. heat) guns, and spray devices.

An advantage of liquid adhesives for industrial applications is their ability to be used as spray adhesives. Spray adhesives can be applied to relatively large areas in a reliable, clean and time-efficient manner.

An advantage of solvent-based adhesives is that, due to the volatility of the solvent(s), the drying time of the adhesive can be reduced or minimised. A disadvantage of solvent-based adhesives is that many solvents exhibit relatively high flammability, thus causing potential health and safety risks during use.

A problem in the adhesive industry is the difficulty to prepare adhesive compositions which exhibit one or more desired properties such as high volatility and/or low flammability. This may be particularly relevant when the adhesive is a solvent-based adhesive, and/or when the adhesive is provided as a spray-adhesive.

It is an object of the present invention to obviate and/or mitigate the limitations and/or disadvantages associated with the prior art and/or with conventional systems.

SUMMARY OF THE INVENTION

According to a first aspect of the present disclosure there is provided a method for preparing a sprayable composition, the method comprising:
  (i) providing a composition in a container, wherein the composition comprises at least one core component and at least one solvent. wherein the at least one core component comprises at least one polymer or resin;
  (ii) sealing the container;
  (iii) providing a flammability reducer in the container; and
  (iv) pressurising the container with a gas propellant.

The method may comprise providing step (i)-(iv) sequentially.

The composition may comprise, may consist essentially of or may consist of an adhesive composition, a coating composition (e.g., a paint), or a primer composition. Generally, the composition may comprise or may be any composition typically used as a sprayable composition.

The method may comprise mixing the at least one core component and at least one solvent to provide the composition.

The method may comprise mixing the at least one core component and at least one solvent before providing the mixture/composition in the container. Alternatively, or additionally, the method may comprise mixing the at least one core component and at least one solvent in the container. Advantageously, method may comprise mixing the at least one core component and at least one solvent before providing the mixture in the container. By such provision, the need to provide means for mixing the at least one core component and at least one solvent inside the container, e.g. via stirrers, shaking devices, or the like, may be avoided.

In an embodiment, the composition may comprise or may be an adhesive composition. The adhesive composition may comprise at least one adhesive and at least one solvent. The method may comprise mixing the at least one adhesive and at least one solvent to provide the adhesive composition.

The method may comprise mixing the at least one adhesive and at least one solvent before providing the mixture, e.g. the adhesive composition, in the container. Alternatively, or additionally, the method may comprise mixing the at least one adhesive and at least one solvent in the container. Advantageously, the method may comprise mixing the at least one adhesive and at least one solvent before providing the mixture in the container. By such provision, the need to provide means for mixing the at least one adhesive and at least one solvent inside the container, e.g. via stirrers, shaking devices, or the like, may be avoided.

Typically, the container may be a sealed container, e.g. a canister. Canisters may be particularly well suited as spray-adhesives containers, e.g., for industrial applications. The container may be an aerosol container or canister, such as a 500 mL aerosol can, or a canister such as 22 L canister or a 110 L canister.

The at least one core component, e.g., adhesive, may comprise a polymeric adhesive and/or a polymeric resin. The at least one core component, e.g., adhesive, may comprise, may consist essentially of or may consist of one or more polymers selected from a thermoplastic elastomer, e.g. styrene butadiene (SBR), styrene-butadiene-styrene block copolymer (SBS) or styrene-isoprene-styrene block copolymer (SIS). A person of skill in the art will understand that other sprayable polymers or resins may be used, depending on the intended use for the composition, e.g. for the adhesive. For example, the at least one core component, e.g. adhesive, may comprise, may consist essentially of or may consist of one or more components/polymers selected from acrylic resins, or thermoset resins such as epoxy resins or the like.

The at least one solvent may comprise at least one organic solvent. The at least one solvent may comprise, may consist essentially of or may consist of one or more solvent selected from an ester, e.g., methylacetate or ethylacetate, a ketone, e.g. methyl ethyl ketone (MEK) or acetone, or a halogenated solvent, e.g. transdichloroethylene. The at least one solvent may comprise, may consist essentially of or may consist of transdichloroethylene. Transdichloroethylene is a solvent which exhibits relatively low flammability. A person of skill in the art will understand that other solvents may be used, depending for example on the particular core component, e.g., adhesive, used in the composition.

The flammability reducer may comprise, may consist essentially of or may consist of trans-1-chloro-3,3,3-trifluoropropene. The flammability reducer may be a compound of formula (I):

$$CF_3—CH=CClH \qquad (I)$$

In an embodiment, the flammability reducer, e.g., trans-1-chloro-3,3,3-trifluoropropene, may be the compound marketed a Solstice® PF-C by Honeywell.

The gas propellant may comprise at least one inert gas. The gas propellant may comprise, may consist essentially of or may consist of one or more gas selected from carbon dioxide ($CO_2$), nitrogen, argon, or a halogenated gas such as 1,3,3,3-tetrafluoropropene (e.g., as marketed as 'HFO 1234ZE' by Honeywell) or trans-1-chloro-3,3,3-trifluoropropene (e.g., as marketed as 'HFO 1233ZD' by Honeywell). Typically, the gas propellant may comprise, may consist essentially of or may consist of carbon dioxide.

Advantageously, pressurising the canister with a gas propellant may promote, facilitate and/or help mixing of the flammability reducer with the composition, e.g., adhesive composition. Such mixing under pressure may provide the advantageous effect of reducing the flammability of the sprayable composition, while mitigating, minimising, or avoiding any problem associated with its high volatility. Advantageously also, the present method may reduce or avoid the need to provide expensive or impractical mixing means to mix the flammability reducer with the composition. The method may allow the provision of a substantially homogeneous sprayable composition.

Certain flammability reducers, such as trans-1-chloro-3,3,3-trifluoropropene (Solstice® PF-C) typically are highly volatile. This makes these compounds difficult to mix in a composition, such as an adhesive composition, without them evaporating. Thus, the inventors have discovered a new process for preparing a sprayable, non-flammable, solvent-based composition.

The method may consist of steps (i), (ii), (iii) and (iv).

In an embodiment of the first aspect, there is provided a method for preparing a sprayable composition, the method comprising:

(i) providing a composition comprising at least one core component comprising least one polymer or resin, and transdichloroethylene in a container;

(ii) sealing the container; (iii) providing trans-1-chloro-3,3,3-trifluoropropene in the container; and (iv) pressurising the container with a gas propellant.

The method may comprise providing step (i)-(iv) sequentially.

In another embodiment of the first aspect, there is provided a method for preparing a sprayable adhesive composition, the method comprising:

(i) providing an adhesive composition comprising at least one adhesive and transdichloroethylene in a container;

(ii) sealing the container;

(iii) providing trans-1-chloro-3,3,3-trifluoropropene in the container; and (iv) pressurising the container with a gas propellant.

The method may comprise providing step (i)-(iv) sequentially.

The amount of core component or adhesive, e.g., polymer or resin, may be in the range of about 10-50 wt %, e.g. about 20-40 wt %, typically about 27-32 wt %, relative to the amount of the composition, e.g., of the adhesive composition.

The amount of solvent, e.g., transdichloroethylene, may be in the range of about 50-90 wt %, e.g. about 60-80 wt %, typically about 68-73 wt %, relative to the amount of the composition, e.g., of the adhesive composition.

The amount of flammability reducer, e.g., trans-1-chloro-3,3,3-trifluoropropene, may be in the range of about 5-50 wt %, e.g. about 10-30 wt %, typically about 18-25 wt %, relative to the amount of solvent in the composition, e.g., of the adhesive composition.

The amount of gas propellant, e.g., carbon dioxide, may be in the range of about 3-30 wt %, e.g. about 5-25 wt %, typically about 8-20 wt %, relative to the total amount of the sprayable composition. The amount of gas propellant may be determined so as to reach a desired pressure inside the container and/or a desired amount relative to the composition, e.g., adhesive composition.

Typically, the pressure in the container, e.g., canister, following injection of the gas propellant may be in the range of about 100-406 psi (about 6.9-28 bar), e.g. about 150-350 psi (about 10.3-24.1 bar), typically about 200-280 psi (about 13.8-19.3 bar).

The method comprises providing the composition, e.g., adhesive composition, in the container, e.g. a predetermined amount thereof. Typically, the method may comprise pumping the composition, e.g., adhesive composition, in the container. Alternatively, the method may comprise pouring the composition, e.g., adhesive composition, in the container.

Advantageously, the method may comprise sealing the container before providing the flammability reducer. By such provision, the flammability reducer may be provided into the container, e.g., canister, without risk of evaporation thereof due to its high volatility.

The method may comprise providing the flammability reducer in the container, e.g. a predetermined amount thereof. Typically, the method may comprise pumping or injecting the flammability reducer in the container.

The method may comprise connecting an inlet of the container to a supply line, e.g. which may be connected to a supply of the gas propellant. The method may comprise providing, e.g. injecting, the gas propellant, e.g. a predetermined amount thereof. Injection of gas propellant may cause pressurisation of the container, which may facilitate and/or help mixing of the flammability reducer with the composition, e.g., adhesive composition. Such mixing under pressure may provide the advantageous effect of reducing the flammability of the sprayable composition, while mitigating, minimising, or avoiding any problem associated with its high volatility. Advantageously also, the present method may reduce or avoid the need to provide expensive or impractical mixing means to mix the flammability reducer with the composition, e.g., adhesive composition.

According to a second aspect of the present disclosure there is provided a sprayable composition comprising:

a composition comprising at least one core component comprising at least one polymer or resin, and at least one solvent comprising transdichloroethylene;

a flammability reducer comprising trans-1-chloro-3,3,3-trifluoropropene; and a gas propellant comprising carbon dioxide.

The composition may comprise or may be an adhesive composition, a coating composition (e.g., a paint), or a primer composition. Generally, the composition may comprise or may be any composition typically used as a sprayable composition In an embodiment, the composition may comprise or may be an adhesive composition. Thus, according to an embodiment of the second aspect, there is provided a sprayable adhesive composition comprising:

an adhesive composition comprising at least one adhesive comprising at least one polymer or resin and at least one solvent comprising transdichloroethylene;

a flammability reducer comprising trans-1-chloro-3,3,3-trifluoropropene; and a gas propellant comprising carbon dioxide.

Typically, the adhesive composition is provided as a pressurised composition. Typically, the pressure of the composition may be in the range of about 100-406 psi (about 6.9-28 bar), e.g. about 150-350 psi (about 10.3-24.1 bar), typically about 200-280 psi (about 13.8-19.3 bar).

Typically, the composition may be provided in a container, typically a sealed container, e.g. a canister.

Advantageously, providing the sprayable composition as a pressurised composition in a sealed container may promote, facilitate and/or help mixing of the flammability reducer with the composition, e.g., adhesive composition. Such mixing under pressure may provide the advantageous effect of reducing the flammability of the sprayable composition, while mitigating, minimising, or avoiding any problem associated with its high volatility. Advantageously also, the present method may reduce or avoid the need to provide expensive or impractical mixing means to mix the flammability reducer with the adhesive composition.

Certain flammability reducers, such as trans-1-chloro-3, 3,3-trifluoropropene (Solstice® PF-C) typically are highly volatile. This makes these compounds difficult to mix in a composition, such as an adhesive composition, without them evaporating. Thus, the inventors have discovered a new process for preparing a sprayable, non-flammable, solvent-based composition.

The sprayable composition may be as described in relation to the first aspect.

Thus, according to an embodiment of the second aspect, there is provided a sprayable composition comprising:

a composition comprising at least one core component and at least one solvent, wherein the at least one core component comprises at least one polymer or resin and wherein the solvent comprises transdichloroethylene;

a flammability reducer comprising trans-1-chloro-3,3,3-trifluoropropene; and a gas propellant comprising carbon dioxide.

Features described above in respect of the method according to the first aspect are equally applicable to the composition according the second aspect, and are not repeated here merely for reasons of brevity.

According to a third aspect of the present disclosure there is provided a kit for storing a sprayable composition, comprising:

a container; and a sprayable composition provided inside the container, the sprayable composition comprising:

a composition comprising at least one core component and at least one solvent, wherein the at least one core component comprises at least one polymer or resin and wherein the solvent comprises transdichloroethylene;

a flammability reducer comprising trans-1-chloro-3,3, 3-trifluoropropene; and a gas propellant comprising carbon dioxide.

The sprayable composition may be as described in relation to the first aspect or the second aspect.

The container, e.g. canister, may further comprise dispensing means for dispensing the sprayable composition, such as one or more of a nozzle, a trigger, an outlet tube, etc. Thus, the kit may comprise a kit for dispensing, e.g. spaying, a sprayable composition.

Features described above in respect of the method according to the first aspect or the composition according to the second aspect are equally applicable to the kit according the third aspect, and are not repeated here merely for reasons of brevity.

For the avoidance of doubt, any feature described in respect of any aspect of the invention may be applied to any other aspect of the invention, in any appropriate combination. For example, apparatus features may be applied to method features and vice versa.

BRIEF DESCRIPTION OF THE DRAWINGS

The present invention will now be further described in detail and with reference to the figures in which.

DETAILED DESCRIPTION OF THE DRAWINGS

Figure 1:
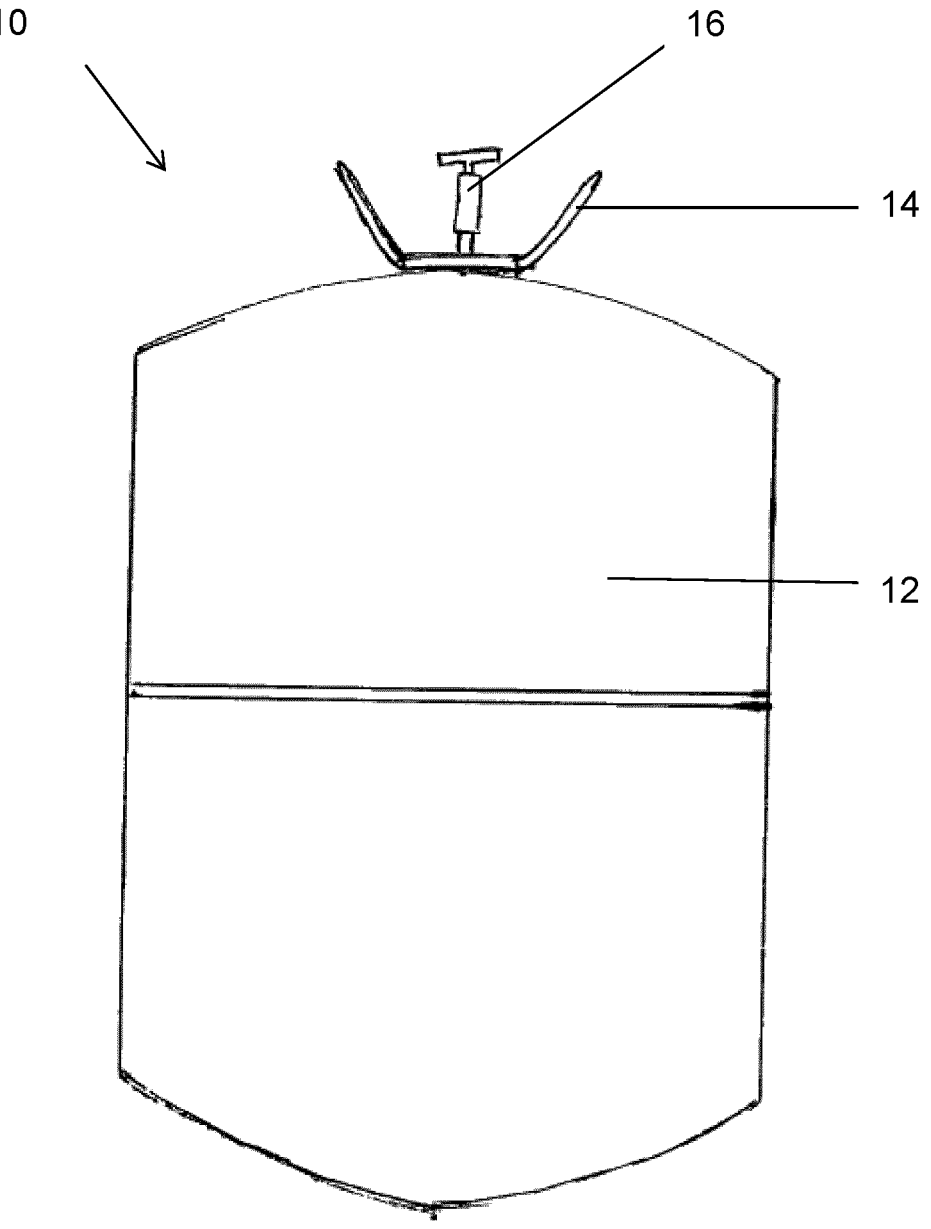
FIG. 1 shows a canister according to a first embodiment.

FIG. 1 shows a canister 10 according to a first embodiment. The canister 10 has a canister body 12, and handle 14, and a valve 16. The canister 10 represents a typical embodiment of a canister suitable to receive a sprayable composition according to the present invention.

Figure 2:
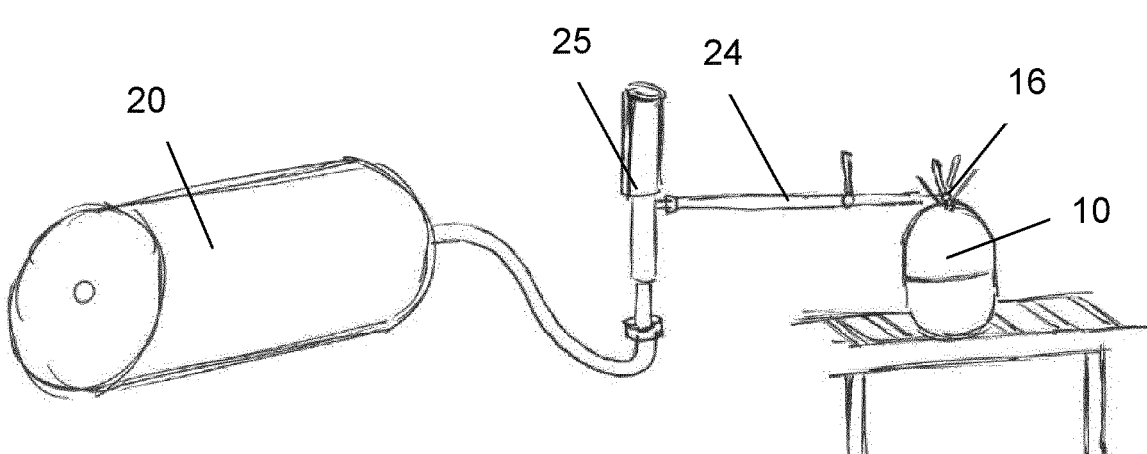
FIGS. 2 and 3 show an embodiment of a set-up useful to implement a method according to a second embodiment.
Figure 3:
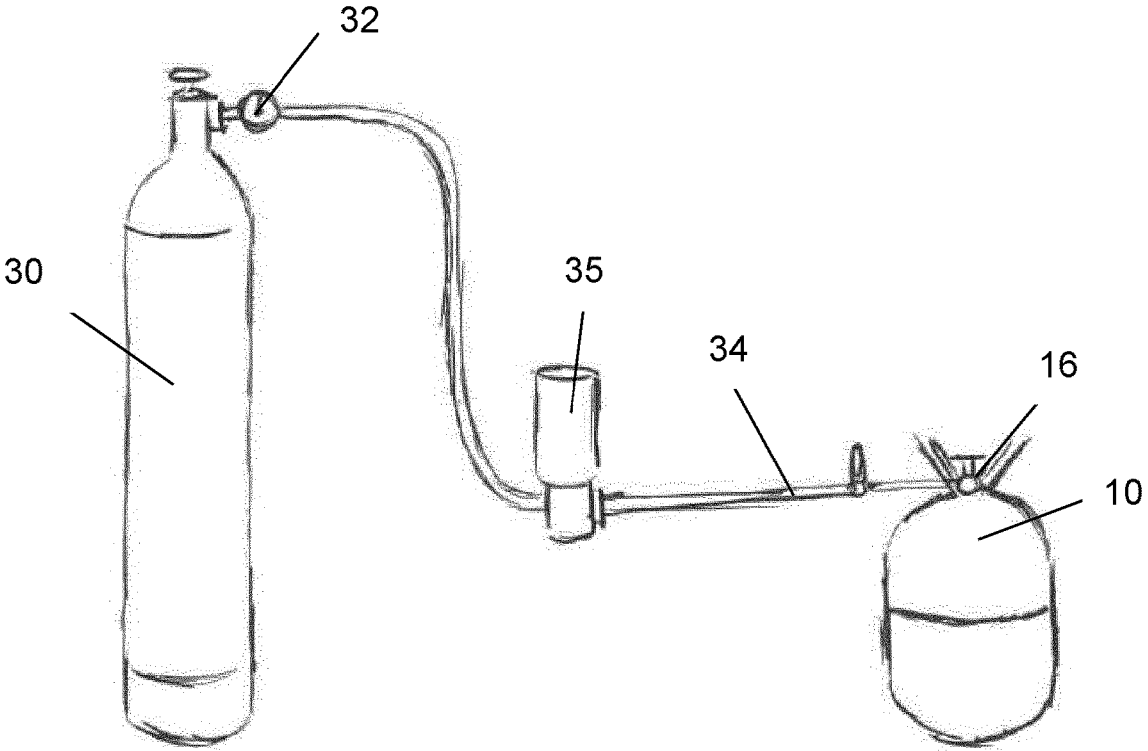

FIGS. 2 and 3 show an embodiment of a set-up useful to implement a method according to a second embodiment, as described in more detail in the examples below.

EXAMPLES

Materials
Adhesive
Adhesives used in the following examples were:
SIS elastomer marketed as Vector® 4255 from TSRC;
SIS elastomer marketed as Vector® 4411 from TSRC.
Solvent
The solvent used in the following examples was Transdichloroethylene (marketed as 1,2-Transdichloroethylene from Samuel Banner & Co Ltd)
Flammability Reducer
The flammability reducer used in the following examples was trans-1-chloro-3,3,3-trifluoropropene marketed a Solstice® PF-C by Honeywell.
Gas Propellant
The gas propellant used in the following examples was carbon dioxide. Carbon dioxide was supplied in 1491 kg tanks procured from Air Products.
Method
A 22.1 L canister 10, as shown in FIG. 1, was used in this example.

In a drum were mixed approximately 30 kg of adhesive and approximately 65 kg of transdichloroethylene solvent.

Upon dissolution of the adhesive in the solvent, 7 kg of the adhesive composition was transferred into the canister 10.

The canister 10 was sealed.

The flammability reducer was then added to the canister. To do this, as shown in FIG. 2, the canister inlet valve 16 was connected to a container 20 of trans-1-chloro-3,3,3-trifluoropropene via tube connection 24. Approximately 1 kg of trans-1-chloro-3,3,3-trifluoropropene was then pumped into the canister 10 via pump 25.

The canister 10 was then pressurised using carbon dioxide. As shown in FIG. 3, the canister inlet valve 16 was connected to a carbon dioxide cylinder 30 equipped with a measuring gauge 32, via tube connection 34. Approximately 1 kg of carbon dioxide was then injected into the canister 10 via regulator 35, leading to a pressure inside the canister 10 of approximately 250 psi (17.2 bar).

It will be appreciated by persons skilled in the art that numerous variations and/or modifications may be made to the invention as described herein without departing from the scope of the present invention. The present embodiments are therefore to be considered for illustrative purposes and are not restrictive, and are not limited to the extent of that described in the embodiment.

The invention claimed is:

1. A sprayable composition comprising:

a composition comprising at least one core component and at least one solvent, wherein the at least one core component comprises at least one polymer or resin and wherein the solvent comprises transdichloroethylene;

a flammability reducer comprising trans-1-chloro-3,3,3-trifluoropropene; and a gas propellant consisting of carbon dioxide, wherein the amount of carbon dioxide is in the range of about 8-20 wt % relative to the total amount of the sprayable composition.

2. A sprayable composition according to claim 1, wherein the composition comprises an adhesive composition, a coating composition, or a primer composition.

3. A sprayable composition according to claim 1, wherein the at least one core component comprises, consists essentially of or consists of one or more polymers selected from styrene butadiene (SBR), styrene-butadiene-styrene block copolymer (SBS) or styrene-isoprene-styrene block copolymer (SIS).

\* \* \* \* \*